(12) United States Patent
Malvasi et al.

(10) Patent No.: US 7,534,825 B2
(45) Date of Patent: May 19, 2009

(54) TFE COPOLYMERS

(75) Inventors: Marco Malvasi, Milan (IT); Valeri Kapeliouchko, Alessandria (IT)

(73) Assignee: Solvay Solexis S.p.A., Milan (IT)

( * ) Notice: Subject to any disclaimer, the term of this patent is extended or adjusted under 35 U.S.C. 154(b) by 379 days.

(21) Appl. No.: 11/002,907

(22) Filed: Dec. 3, 2004

(65) Prior Publication Data

US 2005/0154104 A1     Jul. 14, 2005

(30) Foreign Application Priority Data

Dec. 4, 2003     (IT) .......................... MI2003A2377

(51) Int. Cl.
 *C08J 3/00* (2006.01)
(52) U.S. Cl. .................. 524/155; 523/160; 524/544
(58) Field of Classification Search .................. 524/155, 524/544; 523/160
See application file for complete search history.

(56) References Cited

U.S. PATENT DOCUMENTS

| | | | |
|---|---|---|---|
| 2,559,752 A | 7/1951 | Berry et al. | |
| 3,271,341 A | 9/1966 | Garrison, Jr. et al. | |
| 3,536,643 A | 10/1970 | Stryker et al. | |
| 3,705,867 A | 12/1972 | Holmes et al. | |
| 3,896,071 A | 7/1975 | Poirler et al. | |
| 4,022,742 A * | 5/1977 | Yoshimura et al. | 427/314 |
| 4,369,266 A * | 1/1983 | Kuhls et al. | 523/332 |
| 4,380,618 A | 4/1983 | Khan et al. | |
| 4,864,006 A | 9/1989 | Giannetti et al. | |
| 5,789,508 A | 8/1998 | Baker et al. | |
| 6,518,352 B1 | 2/2003 | Visca et al. | |
| 6,576,703 B2 | 6/2003 | Kapeliouchko et al. | |

FOREIGN PATENT DOCUMENTS

| | | |
|---|---|---|
| EP | 0 194 690 A2 | 3/1985 |
| EP | 0 718 364 A1 | 1/1996 |
| EP | 718364 A1 * | 6/1996 |
| EP | 0 864 317 A1 | 8/1998 |
| EP | 864317 A1 * | 9/1998 |
| EP | 1 452 571 A1 | 9/2004 |
| EP | 1452571 A1 * | 9/2004 |
| EP | 1538177 A1 * | 6/2005 |
| JP | 09-188794 * | 1/1996 |
| WO | 00/35971 | 6/2000 |
| WO | 03/051988 A2 | 6/2003 |

OTHER PUBLICATIONS

Patent Abstracts of Japan, vol. 1997, No. 11 / JP 09 188794 A.
Patent Abstracts of Japan, vol. 1996, No. 5 / JP 08 020611 A.
Schick, et al.; "Nonionic Surfactants"; Surfactant Science Series; 1967 vol. 2, pp. 76-85, 102-125,138,141 and 570-583.

* cited by examiner

*Primary Examiner*—Peter D. Mulcahy
*Assistant Examiner*—Henry Hu
(74) *Attorney, Agent, or Firm*—Arent Fox L.L.P.

(57) ABSTRACT

Dispersions of fluorinated polymers substantially free from fluorinated surfactants, having high stability to shear combined with high stability to segregation, said dispersions comprising one or more anionic surfactants having the following general formula (1):

$$Y'\text{-}(P^1)_n\text{-}CH(Y)\text{-}(P^2)_{n'}\text{-}Y'' \qquad (1)$$

wherein:
 Y, Y' and Y" are anionic or nonionic groups, with the proviso that at least one of Y, Y' or Y" is an anionic group and at least one of the remaining of Y, Y' or Y" is a nonionic group;
 $p^1$ and $p^2$, equal or different, are linear or branched alkylene groups, optionally containing one or more unsaturations, having a number of carbon atoms from 1 to 10, preferably from 1 to 6;
 n and n' equal or different, are zero or 1.

27 Claims, No Drawings

TFE COPOLYMERS

The present invention relates to aqueous dispersions of fluoropolymers substantially fluorinated surfactant free, specifically fluorinated ionic surfactants, said dispersions having high stability to shear and to storage (low segregation rate).

Said aqueous dispersions are used for the typical applications of fluoropolymers, for example coating, without colour problems and crack free.

With aqueous dispersions of fluoropolymers substantially fluorinated surfactant free it is meant that the content of fluorinated surfactants referred to the fluoropolymer weight is lower than 100 ppm, in particular lower than 50 ppm, more specifically lower than 5 ppm.

It is well known in the prior art that for the production of fluorinated polymers there are two different polymerization methods: the suspension polymerization and the emulsion polymerization.

In the suspension polymerization polymer granules having millimetric sizes are obtained.

In the emulsion polymerization an aqueous colloidal dispersion is obtained having particle sizes from some nanometres, generally 10 nm, to hundreds nanometres, from 100 nm to 400 nm. The fluoropolymer emulsion polymerization process is carried out with a slow stirring and in the presence of surfactants not acting as chain transfer agent to avoid to obtain fluoropolymers having a low molecular weight and therefore having poor mechanical properties. Said surfactants are called non telogenic surfactants, see, for example, U.S. Pat. No. 2,559,752. Perfluoroalkanoic acid salts, in particular, the ammonium salt and/or alkaline metal salts of the perfluorooctanoic acid, hereinafter indicated as PFOA, are industrially very often used. Also other (per) fluorinated anionic surfactants are used, see for example U.S. Pat. No. 3,271,341, U.S. Pat. No. 4,380,618, U.S. Pat. No. 4,864.006, U.S. Pat. No. 5,789,508.

The PFOA is the most industrially used surfactant in the emulsion polymerization since it is not telogen, thus allowing to obtain fluorinated polymer dispersions having a high molecular weight, and it allows to obtain stable dispersions for long time.

It is also known that in the applications of fluoropolymer dispersions, as coating or in the impregnation of glass fibers, said fluorinated surfactants can reach the environment, for example through the washing effluents, or disperse in the atmosphere during the drying and/or sintering steps. However some of said surfactants have been classified as harmful for the environment and are characterized by a low bioelimination-rate from the human body. For example the PFOA seems to belong to the surfactants particularly harmful for the environment and with long permanence times in men. Therefore there is a request from the users of fluoropolymer dispersions substantially fluorinated anionic surfactant free, and in particular PFOA-free.

It is known the obtainment of aqueous dispersions of colloidal polymers essentially free from anionic fluorinated surfactants, in particular PFOA. The fluoropolymer dispersion can be treated by ultrafiltration as described in U.S. Pat. No. 4,369,266; or with anionic exchangers as described in U.S. Pat. No. 3,536,643, WO 00/35971, WO 03/051988. U.S. Pat. No. 4,369,266 describes a process to concentrate colloidal dispersions by adding from 0.5 to 12% by weight of a stabilizing surfactant, preferably non ionic, and by recycling the dispersion on a semipermeable ultrafiltration membrane to separate the dispersion in a concentrated fluoropolymeric dispersion and in the permeate which partly contains the fluorinated polymerization surfactant and the stabilizing surfactant. In a particularly preferred embodiment of the process described in this patent the permeate volume separated from the membrane is reintegrated by adding the aqueous solution of stabilizing surfactant at the same concentration as that of the permeate. The permeate separated from the membrane is passed through the anionic exchange resins to separate the fluorinated surfactant. With this process fluoropolymer dispersions substantially fluorinated anionic surfactant free can be obtained. U.S. Pat. No. 3,536,643 describes a process for preparing aqueous dispersions of polyethylene having high molecular weight and substantially perfluorooctanoic acid salt free, comprising the following steps: 1) ethylene polymerization in aqueous medium using a perfluorooctanoic acid salt; 2) addition to the dispersion obtained in the previous step of a nonionic surfactant in a sufficient amount to stabilize the dispersion; 3) removal of the perfluorooctanoate ion by passing the dispersion through anionic exchange resins.

Patent WO 00/35971 describes a process to obtain fluoropolymer dispersions substantially PFOA free. The process consists in adding to the fluoropolymer dispersions a nonionic surfactant in a sufficient amount to stabilize the dispersion and by subsequently removing the perfluoralkanoic ion, preferably perfluorooctanoate, passing the dispersion through anionic exchange resins.

However it has been found by the Applicant that the dispersions having a reduced PFOA content, or wherein PFOA is substantially absent, show remarkable drawbacks as regards the storage stability and the stability to the mechanical stirring. The removal of anionic fluorinated surfactants leads indeed to dispersions significantly less stable than the starting dispersions, i.e. containing PFOA. See the comparative tests. However the above reported patents give no indication for the obtainment of substantially PFOA-free dispersions maintaining a high stability to storage and to stirring.

The dispersion stability to storage and to mechanical stirring are very important properties of the dispersions for the typical applications of fluoropolymer dispersions. In fact it is known that the fluoropolymer dispersions, and in particular of polytetrafluoroethylene, are largely used in the coating industry for their superior antiadherent properties, the good resistance both to chemical and to atmospheric agents and their non flammability. These dispersions are mainly used for the coating of kitchen utensiles, chemical equipments and glass tissues. The stability of such fluoropolymer dispersions is important for their storage and their handling during the application and the processing steps. For example in said steps, transfer, pumping and spraying operations of the dispersion are required, which can lead to the formation of coagula, if the dispersion is not sufficiently stable to shear. The coagulum presence compromises the performances of the final manufactured articles, for example producing defects in coatings.

It is also known that the aqueous fluoropolymer dispersions tend to segregate in the time, giving phase separation with formation of a segregation often no longer dispersible. Therefore the segregated dispersions cannot be used any longer in the above mentioned applications.

To solve the segregation problem of the fluoropolymer dispersions in U.S. Pat. No. 3,705,867 and U.S. Pat. No. 3,896,071, viscosifying agents or a strong excess of nonionic surfacantat are used to reduce the segregation rate. The Applicant has found that viscosifiers do not increase the stability to shear of the dispersions. Besides, both the viscosifiers and the nonionic surfactant excess can give carbon residues during the sintering step in the application process for obtaining coatings, and change the colour of the final manufactured articles. Furthermore in the two above patents dispersions essentially fluorinated surfactant free are not described.

The need was therefore felt to have available fluorinated polymer dispersions having the following combination of properties:
- substantialily fluorinated surfactant free, in particular ionic fluorinated surfactants,
- not harmful for men and for the environment,
- having high stability to storage and to stirring,
- capable to supply coatings having good application properties, in particular absence of colour and cracks and microgels.

The Applicant has found dispersions of fluorinated polymers solving this technical problem.

It is an object of the present invention dispersions of fluorinated polymers substantially fluorinated surfactants free, in particular fluorinated ionic surfactants, preferably anionic, and having high stability to shear combined with high stability to segregation according to the methods hereinafter reported, said dispersions of fluorinated polymers comprising one or more anionic surfactants having the following general formula:

   (1)

wherein:
- Y, Y' and Y" are anionic or nonionic groups, with the proviso that at least one of Y, Y' or Y" be an anionic group and at least one of the remaining of Y, Y' or Y" be a nonionic group; $P^1$ and $P^2$, equal or different, are linear or branched alkylene groups, optionally containing one or more unsaturations, having a number of carbon atoms from 1 to 10, preferably from 1 to 6;
- n and n' equal or different, are zero or 1.

The dispersions of the invention fluorinated polymer are substantially fluorinated surfactant free, in particular fluorinated ionic surfactant, preferably anionic, more preferably perfluorooctanoic acid or its salt.

One or more surfactants of formula (1) can be used.

The preferred anionic groups are selected from $SO_3^-$, $HPO_3^-$ and $COO^-$. Generally the corresponding cations are selected among $H^+$ or those of alkaline metals, ammonium or substituted ammonium ion; the most preferred anionic group is $SO_3^-$ salified with an alkaline metal cation, ammonium or substituted ammonium ion.

The preferred nonionic groups are selected from the following: COOR, CONHR, $CONH_2$, CONRR', wherein R and R' equal or different, have the following meanings:
- $C_2$-$C_{20}$, preferably $C_5$-$C_{15}$, more preferably $C_7$-$C_{15}$, linear or branched hydrogenated alkyls, saturated or containing at least one unsaturation, preferably of ethylene type; when the alkyl has a number of carbon atoms of at least 6, it can contain one or more aromatic rings; in the alkyl group one or more hydrogen atoms can be substituted by fluorine or chlorine atoms, the hydrogenated alkyl groups are preferred;
- siloxane alkyl groups, wherein the alkyl contains from 1 to 7 carbon atoms, preferably methyl.

COOR is preferred among nonionic groups wherein R is as above; when in the compound of formula (1) two nonionic groups COOR are present, the alkyl group in each COOR group can be equal to or different from the other.

Preferably in formula (1) Y is an anionic group and Y', Y" are nonionic groups, equal to or different from each other; one between n and n' has the value of 1 and the other of zero; when n or n' is different from zero, $P^1$ or $P^2$ is methylene.

The surfactant amount of formula (1) in the aqueous fluoropolymer dispersions, expressed in weight per cent on the total weight of the aqueous dispersion, is from 0.001% to 3%, preferably from 0.01% to 0.5%, more preferably from 0.02% to 0.3%.

The aqueous dispersions of the present invention have also the following properties:
- particle diameter of the fluorinated polymer from 10 nm to 400 nm, preferably from 20 nm to 300 nm, still more preferably from 180 nm to 300 nm;
- fluoropolymer concentration from 20% to 75% by weight, preferably from 40% to 70%, referred to the total weight of the dispersion;
- comprising furthermore a nonionic surfactant amount from 0.5% to 30% by weight, preferably from 1% to 15% by weight, more preferably from 1.5% to 10% by weight referred to the total weight of the dispersion;
- said dispersions being substantially fluorinated surfactant free, in particular fluorinated ionic surfactnt, preferably perfluorooctanoic acid or its salt.

With aqueous fluoropolymer dispersions substantially fluorinated surfactant free it is meant that the content of fluorinated surfactants, referred to the polymer weight, is lower than 100 ppm, in particular lower than 50 ppm, more specifically lower than 5 ppm.

With high stability to shear it is meant that a dispersion having a fluorinated polymer content of 60% by weight with average particle diameter in the range 220 nm-280 nm, 3% by weight of nonionic surfactant, preferably Triton® X100 and an amount of the surfactant of formula (1) in the above weight per cent limits, put in a mixer at 20,000 rpm does not coagulate for at least 600 seconds.

With high stability to segregation it is meant that a dispersion having the analytical properties indicated above at the previous paragraph, after 30 days at 25° C. in a closed vessel, shows a lowering of the front of the dispersion (upper surface level) not higher than 8 mm, preferably 6 mm, with respect to the free surface of the liquid phase. See the methods to determine the dispersion stability described in detail in the Examples.

The preferred surfactants of formula (1) are the following:

di-isooctyl sulphosuccinate sodium salt (Aerosol® OT), marketed by CYTEC®;

di-isodecylsulphosuccinate sodium salt, known with the trademark EMULSOGEN® SB10 (Clariant®);

di-isotridecylsulphosuccinate sodium salt, known with the trademark POLIROL® TR/LNA; (CESALPINIA® Chemicals).

The nonionic surfactants used in the dispersions of the present invention are known in the prior art. For example the book "Nonionic surfactants" Ed. M. J. Schick, Marcel Dekker 1967, pages 76-85 and 103-141 can be mentioned. Polyethoxylated alcohols and polyethoxylated alkylphenols, containing one or more propylene oxide units, are preferred among nonionic surfactants. The following nonionic surfactants are those still more preferred:

Triton®X100 (Dow), having formula:

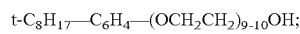

Tergitol®TMN100× (Dow), having formula:

sec-$C_{12}H_{25}$—$(OCH_2CH_2)_{10,1}OH$;

Antarox®863 (Rhodia), having formula:

iso-$C_{13}H_{27}$—$(OCH_2CH_2CH_2)$—$(OCH_2CH_2)_{10}$—$OH$;

Rhodasurf®870 (Rhodia), having formula:

iso-$C_{13}H_{27}$—$(OCH_2CH_2)_{10}$—$OH$;

Genapol®X080 (Clariant), having formula:

iso-$C_{13}H_{27}$—$(OCH_2CH_2)_8$—$OH$.

The fluoropolymers of the invention dispersion are formed of:
tetrafluoroethylene (TFE) homopolymers and TFE copolymers with monomers having at least one unsaturation of ethylene type;
thermoprocessable fluoropolymers (from the melt) based on TFE as PFA, MFA, FEP and ETFE;
VDF-based homopolymers and copolymers;
CTFE-based homopolymers and copolymers, for example PCTFE and E/CTFE copolymer;
VDF-based fluoroelastomers;
  VDF/HFP, optionally containing TFE and/or vinylethers selected from perfluoroalkylvinylethers and/or perfluoroalkoxyalkylvinylethers; optionally containing hydrogenated olefins as ethylene and propylene;
TFE-based (per)fluoroelastomers:
  TFE copolymers with vinylethers selected from perfluoroalkylvinylethers and/or perfluoroalkoxyalkylvinylethers; in particular TFE/PMVE, TFE/PEVE, TFE/PPVE;
  TFE copolymers with hydrogenated olefins, preferably ethylene and/or propylene;
  TFE and/or VDF amorphous and/or crystalline fluoropolymers containing dioxole rings having 5-7 atoms, in particular those obtained by copolymerization with (per)fluorodioxoles or with dienic monomers giving dioxole rings by cyclization.

The copolymers of tetrafluoroethylene (TFE) with monomers having at least one unsaturation of ethylene type comprise comonomers of hydrogenated and fluorinated type. The comonomer amount is preferably lower than 3% by weight, preferably lower than 1% to have non thermoprocessable copolymers (the so called modified PTFE).

Among the hydrogenated comonomers it can be mentioned ethylene, propylene, acrylic monomers, for example methylmethacrylate, (meth)acrylic acid, hydroxyethylenacrylate, styrene monomers, as, for example, styrene.

Among fluorinated comonomers there can be mentioned:
$C_3$-$C_8$ perfluoroolefins, as hexafluoropropene (HFP);
$C_2$-$C_8$ hydrogenated fluoroolefins, as vinyl fluoride (VF), vinylidene fluoride (VDF), trifluoroethylene, $CH_2$=$CH$—$R_{f0}$ perfluoroalkylethylene, wherein $R_{f0}$ is a $C_1$-$C_6$ perfluoroalkyl;
$C_2$-$C_6$ chloro- and/or bromo- and/or iodo-fluoroolefins, as chlorotrifluoroethylene (CTFE);
$CF_2$=$CFOR_{f0}$ (per) fluoroalkylvinylethers (PAVE), wherein $R_{f0}$ is a $C_1$-$C_6$ (per)fluoroalkyl, for example $CF_3$, $C_2F_5$, $C_3F_7$;
$CF_2$=$CFOX_0$ (per)fluoro-oxyalkylvinylethers, wherein $X_0$ is a $C_1$-$C_{12}$ alkyl, or a $C_1$-$C_{12}$ oxyalkyl, or a $C_1$-$C_{12}$ (per)-fluorooxyalkyl having one or more ether groups, for example perfluoro-2-propoxy-propyl;
fluorodioxoles, preferably perfluorodioxoles.

The preferred fluoropolymers of the dispersions obtainable by emulsion or microemulsion polymerization, usable in the process of the present invention, are the TFE copolymers or the TFE homopolymers.

The dispersions can be mono- or bi- or multimodal. For the bi- and multimodal dispersions see, for example, U.S. Pat. No. 6,576,703, U.S. Pat. No. 6,518,352 in the name of the Applicant.

As said, the invention dispersions have the advantage that they do not contain ionic fluorinated surfactants, in particular PFOA; therefore they do not show the toxicity due to these compounds. The invention dispersions are not harmful for men and for the environment.

It has been found by the Applicant that to obtain the stability to segregation, very reduced amounts of the surfactant of formula (1) are sufficient.

It has been unexpectedly and surprisingly found by the Applicant that the fluoropolymer dispersions of the invention can be used in the typical applications of fluoropolymers, for example to produce coating characterized by good application properties, in particular absence of colour, cracks and microgels. In practice these coatings have substantially identical properties to those obtained with the fluoropolymer dispersions containing PFOA.

A further object of the present invention is a process for obtaining the dispersions of the present invention, comprising the steps of preparation of the fluoropolymer dispersion by polymerization; optionally concentration of the same to increase the fluoropolymer amount; substantial reduction of the amount of the ionic fluorinated surfactant, addition of the invention surfactant of formula (1), homogenization of the dispersion.

Among the processes for the substantial reduction of the anionic fluorinated surfactant amount one can mention the ultrafiltration according to U.S. Pat. No. 4,369,266, the treatment with anionic exchangers described in U.S. Pat. No. 3,536,643 and in WO 00/35971.

Another process which can be used comprises the following steps:
a)
  step a1) addition of:
    a non ionic surfactant having cloud point (CP) between 40° and 80° C., in an amount from 1.5% to 50% by weight, preferably from 2.5% to 30% by weight on the dispersion fluoropolymer;
    optionally an electrolyte in an amount such to bring the specific conductivity of the dispersion, measured at 25° C., to values in the range 130-8,000 µS/cm, preferably 250-3,000 µS/cm; and
    optionally a buffer agent to have a pH between 2 and 12, preferably between 3 and 10,
  to a fluoropolymer dispersion obtainable by an emulsion or microemulsion polymerization process;
  step a2):
    heating of the dispersion obtained in step a1), under stirring, up to a temperature $T_c$ in the range CP±10° C., preferably in the range CP±5° C., CP being the cloud point of the used nonionic surfactant;
    decantation without stirring, by operating at the temperature $T_c$, until obtaining the dispersion separation in the following aqueous phases:
      a lower phase containing the concentrated fluoropolymer, wherein the fluoropolymer concentration is in the range 40%-75% w/w, preferably 60%-75% w/w,
      a supernatant phase substantially not containing fluoropolymer;

supernatant separation;
discharge and recovery of the lower phase containing the concentrated fluoropolymer;
b)
step b1):
the dispersion of the recovered lower phase obtained in step a2), after supernatant separation, is additioned:
optionally, with an electrolyte in an amount such to bring the specific conductivity of the dispersion, measured at 25° C., to values in the range 130-8,000 μS/cm, preferably 250-3,000 μS/cm;
a non ionic surfactant having cloud point (CP) in the range 40°-80° C., and such to be present in the dispersion in an amount from 1.5% to 50% by weight, preferably from 2.5% to 30% by weight on the dispersion fluoropolymer;
optionally, a buffer agent to have a pH in the range 2-12, preferably 3-10;
step b2):
repetition of the steps indicated in step a2); optionally
c)
step c1):
repetition of step b1) but by using the dispersion obtained in
step b2)
step c2):
repetition of the steps indicated in step b2).

The fluoropolymer dispersions obtainable with an emulsion or microemulsion polymerization process, generally have the following properties:
particle diameter from 10 nm to 400 nm, preferably from 20 nm to 300 nm,
fluoropolymer concentration from 10% to 45% by weight, preferably from 20% to 35%,
amount of fluorinated anionic surfactant in the range 800 ppm-10,000 ppm, preferably 1,200 ppm-6,000 ppm referred to the polymer weight.

From the industrial point of view the polytetrafluoroethylene (PTFE) dispersions obtainable by an emulsion polymerization process typically have an amount of fluorinated anionic surfactant in the range about 2,500 ppm-about 5,000 ppm, preferably 3,000 ppm-4,000 ppm referred to the polymer weight.

It has been found by the Applicant that when the surfactant amount in the initial fluoropolymer dispersion, obtainable with an emulsion or microemulsion polymerization process, is lower than about 3,000 ppm referred to the fluoropolymer weight, and for fluoropolymer concentrations in the dispersion of about 30% by weight, steps a) and b) are sufficient to obtain fluoropolymer dispersions substantially free from anionic fluorinated surfactants. When the surfactant amount in the initial dispersion is higher than about 3,000 ppm referred to the fluoropolymer weight and operating with a fluoropolymer concentration of about 30% by weight, three steps (a)+b)+c) are necessary.

It has been surprisingly and unexpectedly found that with the above process, the fluoropolymer dispersions are substantially free from anionic fluorinated surfactant: the amount of said surfactant is lower than 100 ppm referred to the polymer weight. This allows to accomplish an industrial plant.

Preferably to substantially reduce the amount of fluorinated anionic surfactant, in addition to steps a), b), c), also the following step is carried out:
d)
step d1):
repetition of step c1) but by using the dispersion obtained in step c2);
step d2):
repetition of the steps indicated in step c2).

The fluoropolymer dispersions obtained in step d2) contain an even lower amount of said anionic fluorinated surfactant.

Still more preferably the above process, to substantially reduce the amount of anionic fluorinated surfactant comprises, besides steps a), b), c), d) also step e) and optionally the successive step f), to obtain fluoropolymer dispersions containing a few ppm of fluorinated anionic surfactant:
e)
step e1):
repetition of step d1) but by using the dispersion obtained in step d2);
step e2):
repetition of the steps indicated in step d2);
f)
step f1):
repetition of step e1) but by using the dispersion obtained in step e2);
step f2):
repetition of the steps indicated in step e2).

In step a2) the supernatant is purified to recover the surfactants, in particular the anionic fluorinated surfactants. This is carried out by treatment with solid adsorbers, preferably anionic exchange resins. All the other supernatants obtained in steps b2), c2), d2), e2), f2) can be subjected to the above process to recover the surfactants.

In steps a1), b1), c1), d1), e1), f1) one or more surfactants can be used so that the surfactant mixture has a CP value in the range indicated in a1). The mixture CP is measured according to the methods indicated in the Examples.

The non ionic surfactants used in the process of the present invention having cloud point (CP) in the range 40° C.-80° C. are known in the prior art. The book "Nonionic surfactants" Ed. M. J. Schick, Marcel Dekker 1967, pages 76-85 and 103-141 can for example be mentioned. Preferably the nonionic surfactants used in the process of the present invention have a CP from 45° C. to 70° C.

It has been found by the Applicant that the use of surfactants of formula (1) in one or more of the steps a)-f) of the above process to substantially reduce the anionic fluorinated surfactant amount, allows to improve the efficiency of the separation between the lower phase containing the concentrated fluoropolymer and the upper phase not containing the fluoropolymer, carried out at the end of each step. For example it can be added in step b1), or also in step f1), or in more steps, for example b1) and c1).

As said, the aqueous dispersions of the present invention contain as essential components one or more surfactants of formula (1), one or more nonionic surfactants. Furthermore other ionic surfactans can be present, which in the absence of surfactants of-formula (1) would not give stability to shear and to segregation. Examples of the last ionic surfactants are sodium dodecyl-sulphate and sodium dodecyl-benzensulphonate.

Furthermore the invention dispersions can contain the usual additives added to the fluoropolymer dispersions, as for example bactericides, antifoam agents, pH regulators, wetting agents, solvents, etc.

The following Examples are given for illustrative and not limitative purposes of the present invention.

EXAMPLES

All the percent data are expressed by weight, where not otherwise indicated.

Determination of the Average Particle Diameter in the Latex

The average particle diameter is determined by an instrument based on laser light diffusion, in particular on Photon Correlation Spectroscopy, equipped with Brookhaven correlator model 2030 AT and Argon Laser light source having a wave length of 514.5 nm by Spectra-Physics. The latex samples to be measured are diluted with water filtered on 0.2 µm Millipore filter. The scattering measurement is carried out at room temperature (20° C.) at an angle of 90°. The latex particle diameter is obtained by the cumulant method.

Evaluation of the Colour Properties of the Sintered Film

The colour properties of the sintered film are evaluated by visual comparison of transparent films and after the film application on a black background to better point out the yellowing effects. In the former case the dispersion is applied by casting on an aluminum plate kept at a constant inclination of 45° with respect to the horizontal plane, so to obtain a gradient of thickness from 0 to 10 µm for 18 cm of length. After drying at room temperature, the deposited film is sintered at 400° C. for 10 minutes.

The evaluation on black background is carried out by using the concentrated dispersion in the preparation of an acrylic formulation, resulting to have the following per cent composition: 45% PTFE, 1.5% acrylic resin Rhodopas® D906, 3.5% Triton® X100, 1.2% sodium and triethanolammonium salt of lauric acid, 0.5% mica, 2% xylene, 2% butylcellosolve and the complement to 100 is water.

The obtained formulation is applied by spray on a sanded aluminum plate previously treated with a black primer based on polyamidoimide resin, so to obtain a thickness of about 30 µm. After drying at room temperature, the deposited film is sintered at 400° C. for 10 minutes.

Determination of the Critical Thickness

The critical thickness of the sintered film is determined by optical microscopy on a film applied by casting on a plate as described in the above reported method.

With critical thickness it is meant the maximum thickness obtainable without cracks and surface defects of the film.

Determination of the Dry Product (Polymer) Content in the Polymerization Latex 20 grams of latex are weighed in a glass beaker and placed in a stove to dry for 1 hour at 150° C. The latex dry content is obtained from the formula:

Dry product %=weight after drying/latex initial weight*100.

Determination of the Polymer and of the Nonionic Surfactant Content in the Concentrated Dispersions A sample of about 1 gram of the concentrated dispersion is weighed in an aluminum shuttle and dried in a stove for 1 hour at 105° C. The shuttle is weighed, obtaining the sample weight after drying, and introduced in muffle at the temperature of 400° C. for 10 minutes (sintering). At the end the shuttle is weighed again, obtaining the sample weight after sintering.

The polymer content of the concentrated dispersion is obtained from the formula:

$$\text{Polymer \%} = \frac{\text{weight after sintering}}{\text{initial dispersion weight}} \times 100$$

The nonionic surfactant content of the concentrated dispersion is obtained from the formula:

$$\text{surfactant \%} = \frac{\text{weight after drying} - \text{weight after sintering}}{\text{initial dispersion weight}} \times 100$$

PFOA Determination

The quantitative determination of the PFOA content in the dispersion is carried out by the method described in "Encyclopedia of Industrial Chemistry Analysis", vol.1, pages 339-340, Interscience Publishers, New York, N.Y., 1971, and in EP-A 194,690.

PFOA is converted into methyl ester and the ester content gaschromatografically analyzed. The method sensitivity limit is of 1 ppm.

Determination of the Cloud Point (CP) of a Nonionic Surfactant

The CP is determined according to the standard EN 1890 Method A, at concentration 1% w/w in water of the nonionic surfactant.

Determination of the Stability to Shear 300 ml of dispersion containing 60% by weight of fluorinated polymer and 36 by weight of nonionic surfactant are placed in a Waring model mixer having 1 litre volume beaker. The dispersion is subjected to strong stirring at 20,000 rpm. The time necessary to start the dispersion coagulation is determined.

Determination of the Coagulum Amount Present in the Dispersion, Calculated with Respect to the Polymer 500 g of dispersion are filtered through a nylon net of known weight with mesh equal to 50 µm. At the end of the filtration 500 ml of water are let pass through the net to remove from the net the dispersion in excess. The net with the possible residue is dried in a stove at 105° C. for 1 hour and then weighed. The coagulum amount is determined by the difference with respect to the initial weight of the net. By dividing the difference by the polymer amount contained in 500 g of dispersion and multiplying by 100, the coagulum percentage in the polymer is obtained.

The method sensititivy limit is 0.005% by weight on the polymer.

Determination of the Specific Conductivity

The specific conductivity is determined at the temperature of 25° C., by Crison 525 conductimeter.

Determinazione of the Stability to the Segregation of the Dispersion 15 ml of a dispersion containing 60% by weight of fluorinated polymer and 3% by weight of a nonionic surfactant are transferred-into a 20 ml pyrex glass test tube having a diameter of 1.4 cm. The test tube is sealed and conditioned at 25° C. The test tube content is examined at the times indicated in the Examples reported hereinafter, it is observed if the dispersion meniscus has lowered with respect to that corresponding to the 15 ml volume of the initially fed dispersion, and the height of the most limpid phase between the two meniscuses is determined.

Example 1-a

Polymerization 11 grams of the aqueous solution of ammonium perfluorooctanoate at a concentration 100 g/litre and 31 litre of carefully degassed demineralized water are fed into a 50 litre autoclave equipped with a mechanical stirrer and previously placed under vacuum. 140 grams of paraffin with softening point in the range 52° C.-54° C. were also previously introduced in the reactor. The autoclave is kept under mechanical stirring and is pressurized with TFE up to a pressure of 20 bar at a temperature of 68° C. At this point 500 ml of a solution of $(NH_4)_2S_2O_8$ (APS) and disuccinic peroxide (DSAP) corresponding to 400 mg of APS and 2,000 mg of DSAP are fed into the autoclave.

When the pressure in the reactor has decreased of 0.5 bar, one starts to feed TFE by a compressor so to maintain a constant pressure of 20 bar inside the reactor. In the meantime the internal reactor temperature is increased up to 78° C. at a rate of 0.5° C./min. During the reaction 50.6 grams of the aqueous solution at 100 g/litre of ammonium perfluorooctanoate are fed into the autoclave. After 90 minutes, when 15,800 grams of TFE have reacted, the TFE feeding is stopped and the reactor evacuated and cooled. The discharged latex has a solid content of 30% w/w.

The diameter of the primary polymer particles determined by Laser Light Scattering (LLS) is of 248 nm.

The PFOA content is 3,900 ppm calculated with respect to the dry polymer weight.

Example 1-c

Obtainment of a Concentrated Dispersion not Containing PFOA by Reconcentration step a)

In a 30 litre thermostatable reactor 18,000 g of PTFE dispersion of the Example 1-a, and having a solid content equal to 30% and a PFOA content equal to 3,900 ppm with respect to the polymer, are introduced. As nonionic surfactant, Triton® X100 having CP=67° C. is used. 3,600 g of this surfactant at 25% by weight (16.7% by weight with respect to the polymer) and 90 g of ammonium sulphate solution at 10% by weight (0.17% with respect to the polymer) are added to the dispersion. The mixture, which results homogeneous, has a specific conductivity at 25° C. equal to 1,280 µS/cm and pH equal to 4.5. The mixture is heated to 68° C. under stirring. When this temperature is reached, the stirring is stopped and the mixture let decant for one hour at the same temperature. It is observed separation of a concentrated phase in polymer in the lower part of the reactor and of an upper phase rich in surfactant Triton® X100, substantially not containing PTFE.

At the end the mixture is let cool at room temperature and from the lower part of the reactor a concentrated dispersion is discharged, resulting coagula free (<0.005% by weight on the polymer), having a polymer content of 69% by weight and a Triton® X100 content equal to 2% by weight. The PFOA content referred to the polymer is equal to 620 ppm. The upper phase present in the reactor, rich in surfactant Triton® X100, is treated with anionic exchange resins Amberjet®4400OH (Rohm & Haas) for the PFOA removal and reused in the process.

step b)

7,500 g of the obtained dispersion are introduced in a 30 litre thermostatable reactor. 2,400 g of Triton® X100 at 25% by weight, 7,500 g of demineralized water and 45 g of ammonium sulphate solution at 10% are added to the dispersion. The ammonium sulphate solution amount, added in this step, is lower than that of the previous step since the treated latex contains a residual amount of ammonium sulphate.

The total content in Triton® X100 is equal to 14.5% with respect to the polymer, while the specific conductivity of the mixture is equal to 1,010 µS/cm, the pH equal to 8.3. The homogeneous mixture is heated to 67.5° C. under stirring.

At this point the same process described in the previous step is repeated finally recovering a concentrated dispersion, resulting coagula free, having a polymer content equal to 71.5%, a Triton® X100 content equal to 2% and a PFOA content referred to the polymer equal to 150 ppm. The upper phase present in the reactor, rich in surfactant Triton® X100, is treated as mentioned above to be reused in the process.

step c)

7,100 g of the obtained dispersion are introduced in a 30 l thermostatable reactor. 2,800 g of Triton® X100 at 25%, 10,000 g of demineralized water and 45 g of ammonium sulphate solution at 10% are added to the dispersion. The total content in Triton® X100 is equal to 16.6% with respect to the polymer, while the specific conductivity of the mixture, appearing homogeneous, is equal to 950 µS/cm, the pH equal to 8.4. The mixture is heated to 67.5° C. under stirring.

At this point the same process described in the previous step is repeated finally recovering a concentrated dispersion, resulting coagula free, having a polymer content equal to 67% and a Triton® X100 content equal to 2.1%. The PFOA content referred to the polymer is equal to 42 ppm. The upper phase present in the reactor, rich in surfactant Triton® X100, is treated as mentioned above to be reused in the process.

step d)

7,400 g of the obtained dispersion are introduced in a 30 l thermostatable reactor. 2,900 g of Triton® X100 at 25%, 9,000 g of demineralized water and 32 g of ammonium sulphate solution at 10% are added to the dispersion. The total content in Triton® X100 is equal to 17.7% with respect to the polymer, while the mixture conductivity is equal to 810 µS/cm, the pH equal to 8.3. The homogeneous mixture is heated to 67° C. under stirring.

At this point the same process described in the previous step is repeated finally recovering a concentrated dispersion, resulting coagula free, having a polymer content equal to 69.9% and a Triton® X100 content equal to 2.1%. The PFOA content referred to the polymer is 11 ppm.

The upper phase present in the reactor, rich in surfactant Triton® X100, is treated as mentioned above to be reused in the process.

step e)

7,000 g of the obtained dispersion are introduced in a 30 l thermostatable reactor. 2,350 g of Triton® X100 at 25%, 9.000 g of demineralized water and 31 g of ammonium sulphate solution at 10% are added to the dispersion. The total content in Triton® X100 is equal to 15% with respect to the polymer, while the mixture conductivity is equal to 790 µS/cm, the pH 8.5. The mixture, appearing homogeneous, is heated at 66.5° C. under stirring.

At this point the same process described in the previous step is repeated finally recovering a concentrated dispersion, resulting coagula free, having a polymer content equal to 69.9% and a Triton® X100 content equal to 2.1%. The PFOA content referred to the polymer is 3 ppm.

step f)

6,900 g of the obtained dispersion are introduced in a 30 l thermostatable reactor. 2,400 g of Triton® X100 at 25%, 9,000 g of demineralized water and 29 g of ammonium sulphate solution at 10% are added to the dispersion. The total content in Triton® X100 is equal to 15.4% with respect to the polymer, while the mixture conductivity is equal to 810 µS/cm, the pH 8.4. The mixture, appearing homogeneous, is heated at 66.5° C. under stirring.

At this point the same process described in the previous step is repeated finally recovering a concentrated dispersion, resulting coagula free, having a polymer content equal to 67.4% and a Triton® X100 content equal to 2.3%. The PFOA content referred to the polymer is <1 ppm.

Such dispersion has been formulated with a polymer content equal to 60% by weight and a Triton® X100 content equal to 3% by weight with respect to the dispersion and it has been filtered on a 10 µm Pall filter. The filter is polymer residue free. The stability to shear has been measured according to the above described method. It has been found that the dispersion stability is of 5 min and 30 s, representing a sufficiently high value to allow the use thereof in the usual applications of the PTFE dispersions.

Example 1-d

Obtainment of a Concentrated Dispersion not Containing PFOA According to U.S. Pat. No. 4,369,266

An aqueous solution of nonionic stabilizing surfactant Triton® X100 is added to the dispersion obtained in the Example 1-a so to obtain a dispersion having a solid content equal to 25% by weight and a Triton® X100 content equal to 1.7% by weight. The PFOA content referred to PTFE remains equal to 3,900 ppm. 30 kg of this dispersion are introduced in a tank, whose temperature is controlled by a heat exchanger. Then the dispersion is let pass-by a centrifugal pump, through a PVDF semipermeable tubular membrane system with molecular cut of 200 Kdalton, placed in series, and in recircle towards the tank. The inlet pressure on the membranes is equal to 5 bar.

The outlet permeate during the ultrafiltration process is let pass through an intermediate tank to recover the PFOA. The permeate is conveyed by a pump through a column charged with anionic exchange resins on which the PFOA is absorbed. The permeate purified from the PFOA is fed again to the first tank to maintain constant the PTFE and the stabilizing surfactant (Triton® X100) concentrations. After 65 hours a PFOA concentration lower than 5 ppm with respect to the dispersion weight is obtained. The permeate purified from the PFOA is deviated from the system by a valve and a discharge line and the concentration, process is started. After 4 hours a dispersion is obtained having a concentration by weight of PTFE equal to 62% and a Triton® X100 content equal to 3.1%, and a PFOA content lower than 5 ppm with respect to the polymer weight. The obtained dispersion is stable and the ultrafiltration plant result clean, without coagulum formation.

Example 2-a (Comparative)

To 450 g of the dispersion obtained in Example 1-c, water, Triton® X100 and PFOA are added in such amounts to have the following percentages by weight with respect to the dispersion:

polymer content equal to 60% by weight;
Triton® X100 content equal to 3% by weight;
PFOA content equal to 0.1% by weight.

The stability to shear of such dispersion, determined by the above method, is equal to 11 min (660 s). After 30 days of conditioning at 25° C. according to the above method, it is found that the dispersion meniscus has lowered of 6 mm with respect to that of the initially fed dispersion.

The data are summarized in Table 1.

Example 2-b (Comparative)

To 450 g of the dispersion obtained in the Example 1-c, water and Triton® X100 are added in such amounts to have the following percentages by weight with respect to the dispersion:

polymer content equal to 60% by weight;
Triton X100 content equal to 3% by weight.

The PFOA amount is lower than 1 ppm.

The stability to shear of such dispersion, determined by the above method, is equal to 9 min 10 s (550 s). After 30 days of conditioning at 25° C. according to the above described method, it is found that the dispersion meniscus has lowered of 14 mm with respect to that of the initially fed dispersion.

The data of stability to shear and to segregation show that there is a stability loss with respect to the Example 2-a (comparative).

The data are summarized in Table 1.

Example 2-c

To 450 g of the dispersion obtained in the Example 1-c, water, Triton® X100 and AOT surfactant (dioctylsulphosuccinate) are added in such amounts to have the following percentages by weight with respect to the dispersion:

polymer content equal to 60% by weight;
Triton® X100 content equal to 3% by weight;
AOT surfactant content equal to 0.1% by weight.

The stability to shear of the obtained dispersion is of 10 min 20 s (620 s). After 30 days of conditioning at 25° C. according to the above described method, it is found that the dispersion meniscus has lowered of 6 mm with respect to that of the initially fed dispersion.

The data are summarized in Table 1.

Example 2-d

To 450 g of the dispersion obtained in the Example 1-c, water, Triton® X100 and Emulsogen® SB10 (di-isodecylsulphosuccinate—Clariant) are added in such amounts to have the following percentages by weight with respect to the dispersion:

polymer content equal to 60% by weight;
Tritone® X100 content equal to 3% by weight;
Emulsogen® SB10 surfactant content equal to 0.1% by weight.

The stability to shear of the obtained dispersion is of 11 min 40 s (700 s). After 30 days of conditioning at 25° C. according to the above method, it is found that the dispersion meniscus has lowered of 6 mm with respect to that of the initially fed dispersion.

The data are summarized in Table 1.

Example 2-e

To 450 g of the dispersion obtained in the Example 1-c, water, Triton® X100 and Polirol® TR/LNA (di-isotridecylsulphosuccinate—Cisalpinia Chemicals) surfactant are added in such amounts to have the following percentages by weight with respect to the dispersion:

polymer content equal to 60% by weight;
Triton® X100 content equal to 3% by weight;
Polirol® TR/LNA surfactant content equal to 0.1% by weight.

The stability to shear of the obtained dispersion is of 12 min 55 s (775 s). After 30 days of conditioning at 25° C. according to the above method, it is found that the dispersion meniscus has lowered of 6 mm with respect to that of the initially fed dispersion.

The data are summarized in Table 1.

Example 2-f (Comparative)

To 450 g of the dispersion obtained in the Example 1-c, water, Triton® X100 and sodium dodecylsulphate suurfactant are added in such amounts to have the following percentages by weight with respect to the dispersion:
- polymer content equal to 60% by weight;
- Triton® X100 content equal to 3% by weight;
- sodium dodecylsulphate surfactant content equal to 0.1% by weight.

The stability to shear of the obtained dispersion is of 9 min 45 s (585 s). After 30 days of conditioning at 25° C. according to the above method, it is found that the dispersion meniscus has lowered of 10 mm with respect to that of the initially fed dispersion.

The values of the stability to shear and to segregation show that the effect of this hydrogenated anionic surfactant on the PFOA-free dispersion stabilization is lower than that of the hydrogenated anionic surfactants of the present ivnention.

The data are summarized in Table 1.

Example 2-g (Comparative)

To 450 g of the dispersion obtained in the Example 1-c, water, Triton® X100 and sodium dodecylbenzensulphonate surfactant are added in such amounts to have the following percentages by weight with respect to the dispersion:
- polymer content equal to 60% by weight;
- Triton® X100 content equal to 3% by weight;
- sodium dodecylbenzensulphonate surfactant content equal to 0.1% by weight.

The stability to shear of the obtained dispersion is of 9 min 10 s (550 s). After 30 days of conditioning at 25° C. according to the above method, it is found that the dispersion meniscus has lowered of 10 mm with respect to that of the initially fed dispersion.

The same comments of the Example 2-f (comparative) can be repeated.

The data are summarized in Table 1.

Example 2-h

To 450 g of the dispersion obtained in the Example 1-c, water, Triton® X100 and Polirol® TR/LNA (di-isotridecyl-sulphosuccinate—Cisalpinia Chemicals) surfactant are added in such amounts to have the following percentages by weight with respect to the dispersion:
- polymer content equal to 60% by weight;
- Triton® X100 content equal to 3% by weight;
- Polirol® TR/LNA surfactant content equal to 0.02% by weight.

The stability to shear of such dispersion, determined with the above method, is equal to 12 min 10 s (730 s). After 30 days of conditioning at 25° C. according to the above method, it is found that the dispersion meniscus has lowered of 6 mm with respect to that of the initially fed dispersion.

The data are summarized in Table 1.

Example 2-i (Comparative)

To 450 g of the dispersion obtained in the Example 1-c, water, Triton® X100 and PFOA are added in such amounts to have the following percentages by weight with respect to the dispersion:
- polymer content equal to 60% by weight;
- Triton® X100 content equal to 3% by weight;
- PFOA content equal to 0.02% by weight.

The stability to shear of such dispersion, determined with the above method, is equal to 9 min 30 s (570 s). After 30 days of conditioning at 25° C. according to the above method, it is found that the dispersion meniscus has lowered of 6 mm with respect to that of the initially fed dispersion.

The data are summarized in Table 1.

Comments to Table 1

The Table shows that the hydrogenated anionic surfactants of the present invention improve the stability to segregation and to shear of the PFOA-free dispersions.

The stability to segregation of the invention dispersions is the same of the dispersions containing the same PFOA amount, while the stability to shear of the invention dispersions is comparable or higher.

By comparing the results of the Example 2-h with those of the Example 2-1 (comparative), it is observed that the stabilizing effect of the hydrogenated anionic surfactants of the present invention on the dispersion segregation is the same as that of the PFOA even using low concentrtions (0.02%) of each surfactant. Furthermore, in the case of Example 2-h the anionic hydrogenated surfactant, at the concentrtion of 0.02%, confers to the dispersion a stability to shear higher than that of PFOA used at a 5 times higher concentration (0.1%), as in the Example 2-a (comparative).

From the data in the Table it is also noticed that the stability to shear of the dispersion containing 0.02% of PFOA (Example 2-i (comparative)) is not substantially improved with respect to that of the PFOA-free dispersion of the Example 2-b (comparative).

The Table furthermore shows that other hydrogenated anionic surfactants, as sodium dodecyl sulphate and sodium dodecylbenzensulphonate do not increase the stability to shear of the PFOA-free dispersions. As regards the segregation of the dispersion, the stabilizing effect of these surfactants is decidedly lower than that of the surfactants of the present invention.

Example 3-a (Comparative)

To 450 g of the dispersion obtained in the Example 1-d, water and Triton® X100 are added in such amounts to have the following percentages by weight with respect to the dispersion:
- polymer content equal to 60% by weight;
- Triton® X100 content equal to 3% by weight.

The PFOA amount is lower than 5 ppm.

The stability to shear of such dispersion, determined with the above method, is equal to 7 min 45 s (465 s). After 30 days of conditioning at 25° C. according to the above method, it is found that the dispersion meniscus has lowered of 12 mm with respect to that of the initially fed dispersion.

Example 3-b

To 450 g of the dispersion obtained in the Example 1-d, water and Triton® X100 and Polirol® TR/LNA (di-isotridecylsulphosuccinate)—Cisalpinia Chemicals) surfactant are added in such amounts to have the following percentages by weight with respect to the dispersion:
  polymer content equal to 60% by weight;
  Triton® X100 content equal to 3% by weight.
  Polirol® TR/LNA surfactant content equal to 0.1% by weight.

The stability to shear of the obtained dispersion is of 12 min 30 s (750 s). After 30 days of conditioning at 25° C. according to the above method, it is found that the dispersion meniscus has lowered of 6 mm with respect to that of the initially fed dispersion.

This Example shows that the stabilizing capability of the invention surfactants is independent from the process used to obtain the PFOA-free dispersions.

Example 4

The Example 1-c is repeated using a lower amount (1,800 g) of initial dispersion obtained from the Example 1-a and a 3 l thermostatable reactor, but by using the same ratios by weight of Triton® X100 and ammonium sulphate of the Example 1-c. At the sixth step (step f), to the reactor mixture an amount of Polirol® TR/LNA surfactant equal to 0.1% by weight with respect to the mixture itself is added. The mixture is heated to 68° C. under stirring. When this temperature is reached, stirring is stopped and the mixture let decant for 30 min at the same temperature. It is observed a rapid separation of a concentrated phase in polymer in the lower part of the reactor and of an upper phase rich in surfactant Triton® X100, substantially not containing PTFE. At the end the mixture is let cool to room temperature and from the lower part of the reactor a very concentrated dispersion is discharged, coagula free (<0.005% by weight on the polymer), having a polymer content of 73% by weight and a Triton® X100 content equal to 2.1% by weight. The PFOA content referred to the polymer is lower than 1 ppm. To 450 g of the obtained dispersion, water and Triton® X100 are added in such amounts to have the following percentages by weight with respect to the dispersion:
  polymer content equal to 60% by weight;
  Triton® X100 content equal to 3% by weight.
  The PFOA amount is lower than 1 ppm.

The stability to shear of such dispersion, determined with the above method, is equal to 12 min 30 s (750 s). After 30 days of conditioning at 25° C. according to the above method, it is found that the dispersion meniscus has lowered of 6 mm with respect to that of the initially fed dispersion.

The Example shows that by adding the hydrogenated anionic surfactant of the invention during the achievement process according to the Example 1-c of the PFOA-free dispersion, the separation of the polymer concentrated phase takes place in a shorter time and the obtained dispersion has a polymer concentration higher than that obtained in the Example 1-c (67.4% by weight)

Examples 5a-5b-5c

The critical thickness of the sintered film for the dispersions, respectively, of the Examples 2-c, 2d, 2-e has been determined. The critical thickness results higher than 10 µm for all the three films.

Examples 6a-6b-6c

The dispersions of the Examples 2-c, 2-d, 2-e have been used for the preparation of an acrylic formulation as described in the evaluation method of the film colour properties.

The films applied on black background do not show defects, cracks or yellowing evidences.

The results of the Examples 5 and 6 show that the invention dispersions are suitable for the use in fluoropolymer applications.

TABLE 1

Stability to shear (20,000 rpm) and to segregation (25° C. for 30 days) of the preparations of the Examples from 2-a (comparative) to 2-i (comparative).

| | Examples | | | | | | | | |
| --- | --- | --- | --- | --- | --- | --- | --- | --- | --- |
| | 2-a Comp | 2-b Comp | 2-c | 2-d | 2-e | 2-f Comp | 2-g Comp | 2-h | 2-i Comp |
| Stability to shear (s) | 660 | 550 | 620 | 700 | 775 | 585 | 550 | 730 | 570 |
| Stability to segregation (mm) | 6 | 14 | 6 | 6 | 6 | 10 | 10 | 6 | 6 |

The invention claimed is:

1. Aqueous dispersions of fluorinated polymers, obtained by emulsion polymerization, having a content of fluorinated surfactants lower than 100 ppm referred to the polymer weight and a fluoropolymer concentration from 20 to 75%, referred to the total weight of the dispersion, and having high stability to shear combined with high stability to segregation, said dispersions of fluorinated polymers comprising a nonionic surfactant and one or more anionic surfactants having the following general formula:

$$Y'\text{-}(P^1)_n\text{-}CH(Y)\text{-}(P^2)_{n'}\text{-}Y'' \tag{1}$$

wherein:
Y, Y' and Y" are anionic or nonionic groups, with the proviso that at least one of Y, Y' or Y" is an anionic group and at least one of the remaining of Y, Y' or Y" is selected from the group consisting of: COOR, CONHR, CONH$_2$, and CONRR', wherein R and R', independent from each other, are selected from the group consisting of:
$C_2$-$C_{20}$ linear or branched hydrogenated alkyls, saturated or containing at least one unsaturation of ethylene type, wherein when the alkyl has at least 6 carbon atoms, it can contain one or more aromatic rings, and siloxane alkyl groups, wherein the alkyl contains from 1 to 7 carbon atoms; $P^1$ and $P^2$, equal or different, are linear or branched alkylene groups, optionally containing one or more unsaturations, having a number of carbon atoms from 1 to 10; and
n and n' equal or different, are zero or 1.

2. Dispersions according to claim 1 comprising one or more surfactants of formula (1).

3. Dispersions according to claim 1 wherein the anionic groups are selected from $SO_3^-$, $HPO_3^-$ and $COO^-$.

4. Dispersions according to claim 1, wherein R and R', equal or different, are selected from the group consisting of:
$C_5$-$C_{15}$ linear or branched hydrogenated alkyls, saturated or containing at least one unsaturation of ethylene type, wherein when the alkyl has a number of carbon atoms of at least 6, it can contain one or more aromatic rings; and siloxane alkyl groups, wherein the alkyl is methyl.

5. Dispersions according to claim 4, wherein the nonionic group is COOR, R being as above; when in the compound of formula (1) two nonionic groups COOR are present, the alkyl group in each COOR group can be equal to or different from the other.

6. Dispersions according to claim 1, wherein in formula (1) Y is an anionic group; Y', Y" are nonionic groups, equal to or different from each other; one between n and n' has the value of 1 and the other of zero; when n or n' is different from zero, $P^1$ or $P^2$ is methylene.

7. Dispersions according to claim 1, wherein the surfactant amount of formula (1), expressed in percent by weight on the total weight of the aqueous dispersion, is from 0.001% to 3%.

8. Dispersions according to claim 1, having:
particle diameter of the fluorinated polymer from 10 nm to 400 nm;
fluoropolymer concentration from 40% to 70% by weight, referred to the total weight of the dispersion;
and further comprising a nonionic surfactant amount from 0.5% to 30% by weight, referred to the total weight of the dispersion;
said fluorinated surfactants are fluorinated ionic surfactants.

9. Dispersions according to claim 1, wherein the surfactants of formula (1) are selected from:
$C_8H_{17}OOC$-$CH_2$-$CH(SO_3Na)$-$COOC_8H_{17}$;
$C_{10}H_{21}OOC$-$CH_2$-$CH(SO_3Na)$-$COOC_{10}H_{21}$; or
$C_{13}H_{27}OOC$-$CH_2$-$CH(SO_3Na)$-$COOC_{13}H_{27}$.

10. Dispersions according to claim 8, wherein the used nonionic surfactants are polyethoxylated alcohols and polyethoxylated alkylphenols containing one or more propylene oxide units.

11. Dispersions according to claim 10, wherein the nonionic surfactants are selected from;
t-$C_8H_{17}$-$C_6H_4$-$(OCH_2CH_2)_{9\text{-}10}OH$;
sec-$C_{12}H_{25}$-$(OCH_2CH_2)_{10,1}OH$;
iso-$C_{13}H_{27}$-$(OCH_2CH_2CH_2)$-$(OCH_2CH_2)_{10}$-OH;
iso-$C_{13}H_{27}$-$(OCH_2CH_2)_{10}$-OH; or
iso-$C_{13}H_{27}$-$(OCH_2CH_2)_8$-OH.

12. Dispersions according to claim 1, wherein the fluoropolymers are formed of:
tetrafluoroethylene (TFE) homopolymers and TFE copolymers with monomers having at least one unsaturation of ethylene type;
thermoprocessable fluoropolymers (from the melt) based on TFE as PFA, MFA, FEP and ETFE;
VDF-based homopolymers and copolymers;
CTFE-based homopolymers and copolymers;
VDF-based fluoroelastomers:
VDF/HFP, optionally containing TFE and/or vinylethers selected from perfluoroalkylvinylethers and/or perfluoroalkoxyalkylvinylethers; optionally containing hydrogenated olefins;
TFE-based (per)fluoroelastomers:
TFE copolymers with vinylethers selected from perfluoroalkylvinylethers and/or perfluoroalkoxyalkylvinylethers; in particular TFE/PMVE, TFE/PEVE, TFE/PPVE;
TFE copolymers with hydrogenated olefins;
TFE and/or VDF amorphous and/or crystalline fluoropolymers containing dioxole rings having 5-7 atoms, in particular those obtained by copolymerization with (per)fluorodioxoles or with dienic monomers giving dioxole rings by cyclization.

13. Dispersions according to claim 12, wherein the fluoropolymers are the TFE copolymers or the TFE homopolymers.

14. Dispersions according to claim 1, wherein the fluorinated surfactants are anionic.

15. Dispersions according to claim 1, wherein $P^1$ and $P^2$, equal or different, are linear or branched alkylene groups, optionally containing one or more unsaturations, having a number of carbon atoms from 1 to 6.

16. Dispersions according to claim 3, wherein the anionic group is $SO_3^-$.

17. Dispersions according to claim 1, wherein R and $R^1$, equal or different, are $C_7$-$C_{15}$ linear or branched hydrogenated alkyls, saturated or containing at least one unsaturation of ethylene type, wherein when the alkyl has at least 6 carbon atoms, it can contain one or more aromatic rings.

18. Dispersions according to claim 7, wherein the surfactant amount of formula (1), expressed in per cent by weight on the total weight of the aqueous dispersion, is from 0.01% to 0.5%.

19. Dispersions according to claim 7, wherein the surfactant amount of formula (1), expressed in per cent by weight on the total weight of the aqueous dispersion, is from 0.02% to 0.3%.

20. Dispersions according to claim 1, wherein the particle diameter of the fluorinated polymer is from 20 nm to 300 nm.

21. Dispersions according to claim 1, wherein the particle diameter of the fluorinated polymer is from 180 nm to 300 nm.

22. Dispersions according to claim 1, which further comprise a nonionic surfactant amount from 1% to 15% by weight, referred to the total weight of the dispersion.

23. Dispersions according to claim 1, which further comprise a nonionic surfactant amount from 1.5 to 10% by weight, referred to the total weight of the dispersion.

24. Dispersions according to claim 1, wherein said fluorinated surfactants are perfluorooctanoic acid or its salts.

25. Dispersions according to claim 1, wherein the fluoropolymers are formed of PCTFE and E/CTFE copolymers.

26. Dispersions according to claim 1, wherein the fluorinated surfactants are fluorinated ionic surfactants.

27. Dispersions according to claim 1, wherein the fluoropolymers are formed of TFE/PMVE, TFE/PEVE, or TFE/PPVE.

* * * * *